Patented Oct. 12, 1926.

1,603,002

UNITED STATES PATENT OFFICE.

WALTER DUISBERG, OF LEVERKUSEN, NEAR COLOGNE, AND WINFRID HENTRICH, JOHANN HUISMANN, AND LUDWIG ZEH, OF WIESDORF, NEAR COLOGNE, GERMANY, ASSIGNORS TO GRASSELLI DYESTUFF CORPORATION, OF NEW YORK, N. Y., A CORPORATION OF DELAWARE.

N-ACIDOAMINOALKYL-AMINONAPHTHALENE AZO DYESTUFFS.

No Drawing. Application filed June 8, 1925, Serial No. 35,769, and in Germany June 17, 1924.

We have invented new and useful improvements in N-acidoaminoalkyl-aminonaphthalene azo dyestuffs.

Our invention relates to the production of new dyestuffs particularly adapted for the dyeing of animal fibres.

We have found that azo compounds of the type

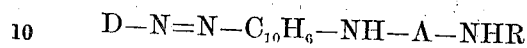

in which formula $D-N=N-$ is the diazo compound and in which the coupling compound is an N-aminoalkyl-2-aminonaphthalene with the external amino group further substituted, dye animal fibres in an acid bath various shades which are distinguished by excellent fastness, specially to light and milling; the dyeings are furthermore exceedingly level. The shades range from red to violet to blue to a large variety of brown hues.

The N-aminosubstituted-alkyl-2-aminonaphthalenes can be represented by the general formula

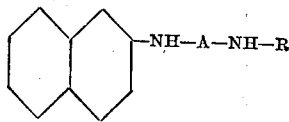

In this type of compounds as embodied in our invention the naphthalene nucleus can be further substituted by hydroxyl, sulfo groups, etc. Amongst the alkyl groups, designed by A in the above formula, which we have found easily accessible and valuable are the ethyl, propyl, butyl, etc. groups. The substituent R in the external amino group represents either an acidyl group such as uryl $-CO-NH_2$, acetyl $-CO-CH_3$, benzoyl $-CO-C_6H_5$, sulfotoluol $-SO_2-C_6H_4-CH_3$, chloracetyl $-CO-CH_2Cl$ or an acid radical such as $-CH_2-COOH$, which latter may be introduced into this amino group by reacting upon same with an acidic compound having a labile chlorine atom linked directly to the carbon chain, as for instance chloracetic acid $Cl-CH_2-COOH$, in presence of a neutralizing agent. For the purpose of this invention we will call "acido" these two types of substituent as indicated in the above formula by the letter R.

While our new dyestuffs are particularly valuable for the dyeing of animal fibres, we have found that if the N-acidoaminoalkyl-aminonaphthalene contains no sulfo or carboxylic group, and if the diazo compound contains only one sulfo- or carboxyl group the azo dyestuffs obtained will dye cellulose ester material, particularly cellulose acetate silks, very bright and fast shades.

The type of diazo compound used to produce our new dyestuffs is of little importance, though of course variations in the chemical constitution of same will, to a certain extent, influence the shade and eventually modify the fastness properties, which are otherwise mainly due to the particular substitution in the coupling compound. The most valuable shades have so far been obtained with diazo compounds of the benzene series, though diazo-naphthalenes may likewise be used.

The process of producing these new azo dyestuffs consists in coupling either in acid, neutral or alkaline solution diazo compounds with N-aminoalkyl-2-aminonaphthalenes, and treating the so-obtained primary dyestuffs with a reagent capable of substituting the external amino group by an acido radical. As such reagents acetic anhydride, chloracetylchloride, p-toluolsulfochloride, chlor-acetic acid have been found most convenient. The dyestuff is then salted out of solution, filtered off and dried.

While this is in most cases our preferred process it might in certain cases be advisable to substitute first the N-aminoalkyl-2-aminonaphthalene compound by an acido radical and to couple then the N-acidoaminoalkyl-2-aminonaphthalene with a diazo compound.

Our new dyestuffs are in general dark powders, easily soluble in water. By reduction, as for instance with zinc and hydrochloric acid, an amine, corresponding to the original diazo compound and an N-aminoalkyl-2-amino-aminonaphthalene or a derivative of same is obtained.

In order to further illustrate our invention, the following examples are given, the parts being by weight.

*Example 1.*—301 parts 2-4-dinitroaniline-6-sulfonate of potassium are diazotized and the diazo obtained coupled in mineral acid solution with 186 parts N-aminoethyl-2-aminonaphthalene dissolved in dilute hydrochloric acid. The coupling proceeds very rapidly. The free dyestuff acid obtained is filtered off and dissolved in hot water with a little alkali. To this solution 100–120 parts acetic anhydride are added at 65–75° C. and the reaction mass allowed to cool. The new dyestuff dyes cellulose acetate silk clear blue shades and wool greenish blue shades. It is in form of its sodium salt a dark powder, easily soluble in water and has most likely the formula

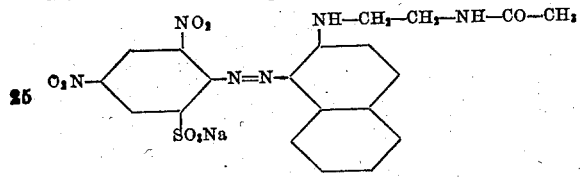

By reduction with zinc and hydrochloric acid a triaminobenzene sulfonic acid and N-aminoethyl-2-amino-1-naphthylamine is obtained.

*Example 2.*—301 parts 2-4-dinitroaniline-6-sulfonate of potassium are diazotized and the diazo compound obtained coupled in mineral acid solution with 228 parts N-acetylaminoethyl-2-aminonaphthalene. The coupling proceeds rapidly. The reaction mass is made slightly alkaline, salted out and the dyestuff isolated in the usual way. It is identical with the product obtained in Example 1.

*Example 3.*—178 parts 4-acetylethylaminoaniline are diazotized in the usual way and coupled in slightly mineral acid solution with 384 parts N-aminoethyl-2-amino-8-naphthol-3-6-disulfonic acid; the intermediate dyestuff is then acetylated and isolated in the usual way. It is in form of its sodium salt a dark powder, easily soluble in water with a reddish brown color. It dyes wool very level, reddish-brown full shades of excellent fastness to light and milling. It has most probably the formula

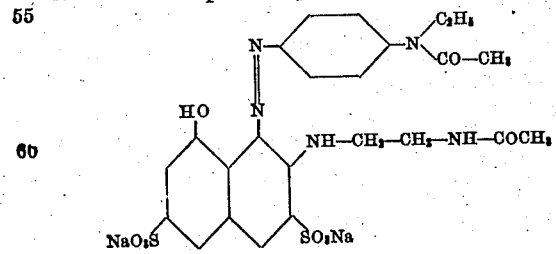

By reduction with zinc and hydrochloric acid 4-ethylaminoaniline and N-aminoethyl-2-amino-1-amino-8-naphthol-3-6-disulfonic acid is obtained.

*Example 4.*—168 parts 5-nitro-2-anisidine are diazotized in the usual way and the diazo solution so obtained is run into an ice cold solution of 384 parts N-aminoethyl-2-amino-8-naphthol-3-6-disulfonate of sodium, containing an excess of sodium bicarbonate. After the coupling is finished the solution is heated to 60–70° C. and acetylated with 100–120 parts acetic anhydride. The dyestuff is salted out hot, filtered off and dried. It is a black powder, easily soluble in water and dyes wool level olive-brown shades of excellent fastness to light and milling. It can be represented by the formula

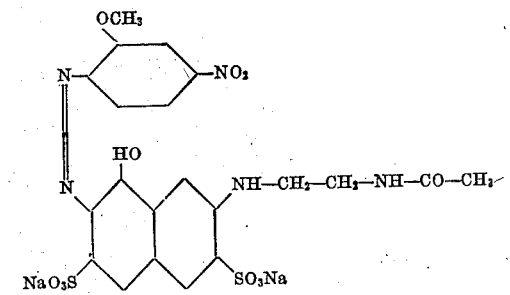

By reduction with zinc and hydrochloric acid diamino anisol and N-aminoethyl-2-amino-7-amino-8-naphthol-3-6-disulfonic acid are obtained.

In the table below a number of other combinations illustrating our invention are described.

| Diazo compound from— | Coupling compound. | Substituent R. | Coupling performed in— | Shades on wool. | Shades on cellulose acetate. |
|---|---|---|---|---|---|
| 4-nitroaniline-2-sulfonic acid. | N-aminoethyl-2-naphthylamine. | Acetyl | Mineral acid. | Violet | Reddish-violet. |
| 4-nitroaniline-2-sulfonic acid. | N-aminoethyl-2-naphthylamine-7-sulfonic acid. | Acetyl | Mineral acid. | Violet | |
| 4-nitroaniline-2-sulfonic acid. | N-aminoethyl-2-naphthylamine-7-sulfonic acid. | Benzoyl | Mineral acid. | Violet | |
| 4-nitroaniline-2-sulfonic acid. | N-aminoethyl-2-naphthylamine-7-sulfonic acid. | Chloracetyl. | Mineral acid. | Violet | |
| 4-nitroaniline-2-sulfonic acid. | N-aminoethyl-2-naphthylamine-7-sulfonic acid. | P-toluolsulfo. | Mineral acid. | Violet | |

| Diazo compound from— | Coupling compound. | Substituent R. | Coupling performed in— | Shades on wool. | Shades on cellulose acetate. |
|---|---|---|---|---|---|
| 4-nitroaniline-2-sulfonic acid. | N-aminoethyl-2-naphthylamine-7-sulfonic acid. | Acetic... | Mineral acid. | Violet... | |
| 2-nitro-4-aminotoluol. | N-aminoethyl-2-amino-8-naphthol-6-sulfonic acid. | Acetyl... | Mineral acid. | Reddish brown. | |
| P-nitroaniline. | N-aminoethyl-2-amino-8-naphthol-3-6-disulfonic acid. | Acetyl... | Mineral acid. | Reddish brown. | |
| M-nitroaniline. | N-aminoethyl-2-amino-8-naphthol-3-6-disulfonic acid. | Acetyl... | Mineral acid. | Reddish brown. | |
| O-nitroaniline. | N-aminoethyl-2-amino-8-naphthol-3-6-disulfonic acid. | Acetyl... | Neutral... | Olive-brown. | |
| M-nitroaniline. | N-aminoethyl-2-amino-8-naphthol-3-6-disulfonic acid | Acetyl... | Alkaline... | Reddish brown. | |
| 4-nitro-2-anisidine. | N-aminoethyl-2-amino-8-naphthol-3-6-disulfonic acid. | Acetyl... | Alkaline... | Reddish brown. | |

We claim:—

1. In processes of producing N-acidoaminoalkyl-2-aminonaphthalene azo dyestuffs the steps comprising coupling a diazo compound with an N-aminoalkyl-2-aminonaphthalene compound and substituting the external amino group by an acido radical, substantially as described.

2. In processes of producing N-acidoaminoalkyl-2-aminonaphthalene azo dyestuffs the steps comprising coupling a diazo compound of the benzene series with an N-aminoalkyl-2-aminonaphthalene compound and substituting the external amino group by an acido radical, substantially as described.

3. In processes of producing N-acidoaminoalkyl-2-aminonaphthalene azo dyestuffs the steps comprising coupling in mineral acid solution a diazo compound of the benzene series with an N-aminoalkyl-2-aminonaphthalene compound and substituting the external amino group by an acido radical, substantially as described.

4. In processes of producing N-acidoaminoethyl-2-aminonaphthalene azo dyestuffs the steps comprising coupling a diazo compound of the benzene series with an N-aminoethyl-2-aminonaphthalene compound and substituting the external amino group by an acido radical, substantially as described.

5. In processes of producing N-acetylaminoethyl-2-aminonaphthalene azo dyestuffs the steps comprising coupling in mineral acid solution a diazo compound of the benzene series with an N-aminoethyl-2-aminonaphthalene compound and acetylating the external amino group.

6. In processes of producing 4-acetylethylamino-benzene-1-azo- (N-acetylaminoethyl)-2-amino-8-naphthol-3-6-disulfonic acid the steps comprising coupling 4-acetylethylamino-1-diazobenzene in mineral acid solution with N-aminoethyl-2-amino-8-naphthol-3-6-disulfonic acid and treating the resulting product with acetic anhydride to effect acetylation of the external amino group.

7. As new products N-acidoaminoalkyl-2-amino-naphthalene azo dyeshtuffs of the general formula $$D-N=N-C_{10}H_6-NH-A-NH-R$$

in which formula D—N=N— stands for a diazo compound, A for an alkylradical and R for an acido radical, which dyestuffs are generally dark powders, soluble in water, dyeing wool from red to violet to blue to brown fast and level shades and yielding by reduction, as for instance with zinc and hydrochloric acid, an amine and an N-aminoalkyl-2-aminonaphthylamine compound or a derivative of same.

8. As new products N-acidoaminoethyl-2-aminonaphthalene azo dyestuffs of the general formula $$D-N=N-C_{10}H_6-NH-CH_2-CH_2-NH-R$$

in which formula D—N=N— stands for a diazo compound and R for an acido radical, which dyestuffs are generally dark powders, soluble in water, dyeing wool from red to violet to blue to brown exceedingly fast and level shades and which by reduction, as for instance by zinc and hydrochloric acid, yield an amine and an N-aminoethyl-2-aminonaphthylamine compound or a derivative of same.

9. As new products N-acetylaminoethyl-2-aminonaphthylene azo dyestuffs of the general formula $$D-N=N-C_{10}H_6-NH-CH_2-CH_2-NH-CO-CH_3$$

in which formula D—N=N— stands for a diazo compound, which dyestuffs are generally dark powders, soluble in water, dyeing wool from red to violet to blue to brown exceedingly fast and level shades and which by reduction as for instance with zinc and hydrochloric acid yield an amine and an N-aminoethyl-2-aminonaphthylamine compound.

10. As new products N-acetylaminoethyl-2-aminonaphthalene azo dyestuffs of the general formula

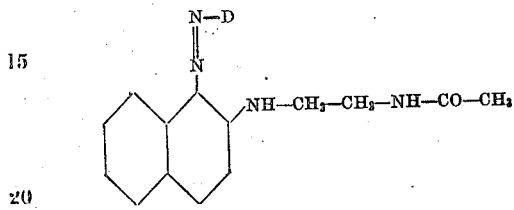

in which D—N=N— stands for a diazo compound, which dyestuffs are generally dark powders soluble in water, dyeing wool from red to violet to blue to brown exceedingly fast and level shades and which by reduction as for instance with zinc and hydrochloric acid yield an amine and an N-aminoethyl-2-amino-1-naphthylamine compound.

11. As new products N-acetylaminoethyl-2-aminonaphthalene azo dyestuffs of the general formula

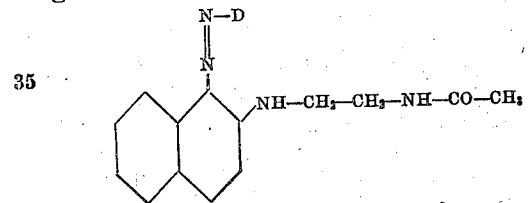

in which D—N=N— stands for a mononuclear diazo compound of the benzene series, which dyestuffs are generally dark powders, soluble in water, dyeing wool from red to violet to blue to brown exceedingly fast and level shades and which by reduction as for instance with zinc and hydrochloric acid, yield a mononuclear amine of the benzene series and an N-aminoethyl-2-amino-1-naphthylamine compound.

12. As a new product 4-acetylethylamino-benzene-1-azo-1-(N-acetylaminoethyl)-2-amino-8-hydroxynaphthalene-3-6-disulphonic acid having most probably the formula

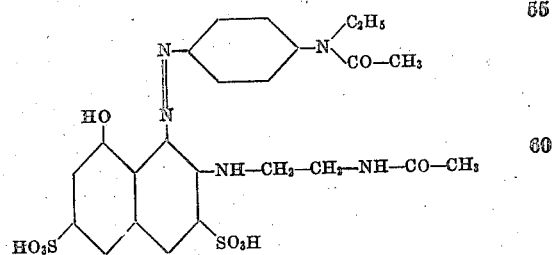

which in form of its sodium salt is a black powder, soluble in water, dyeing wool reddish brown level shades, fast to light and milling and which by reduction as for instance with zinc and hydrochloric acid yields 4-ethylaminoaniline and N-aminoethyl-2-amino-1-naphthylamine-3-6-disulfonic acid.

In testimony whereof we have hereunto set our hands.

WALTER DUISBERG.
WINFRID HENTRICH.
JOHANN HUISMANN.
LUDWIG ZEH.